Figure 1:
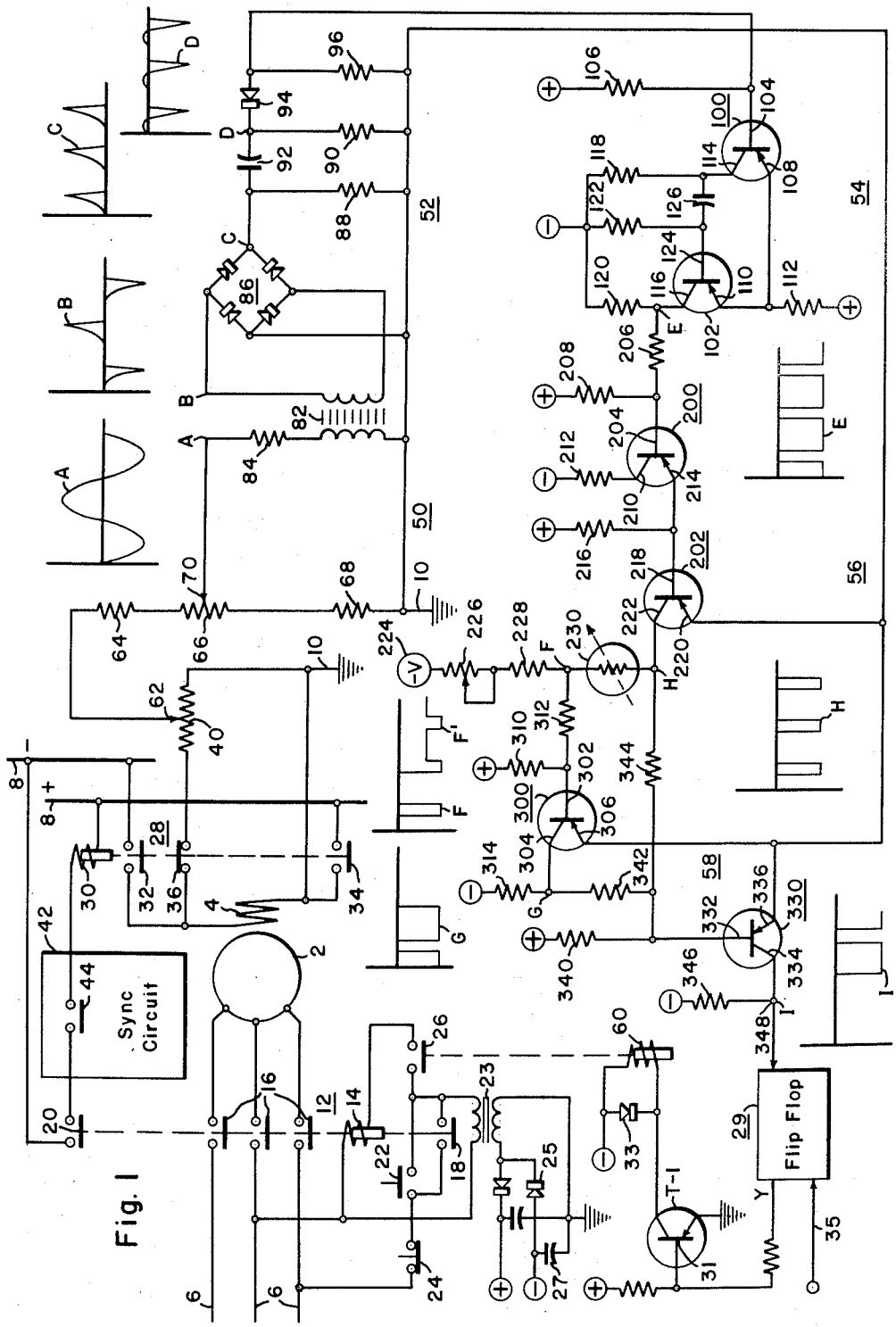

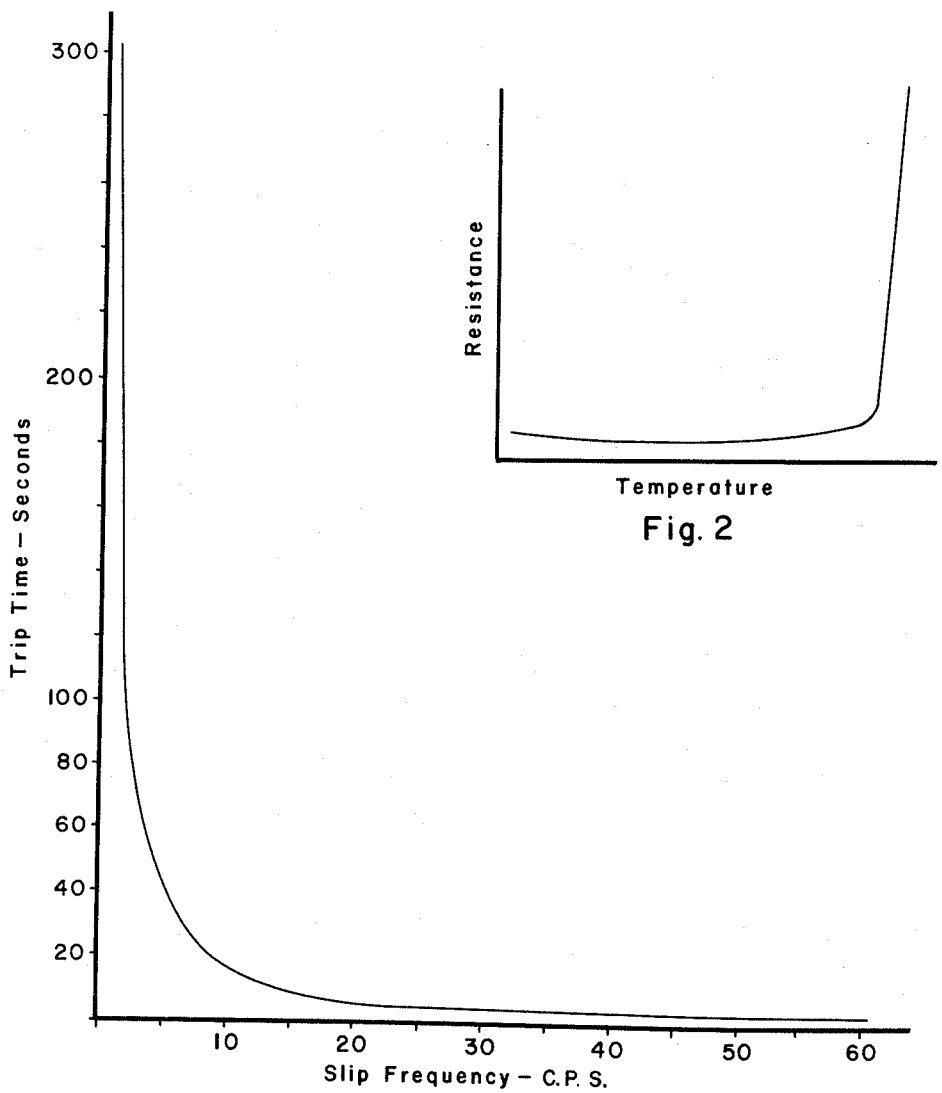
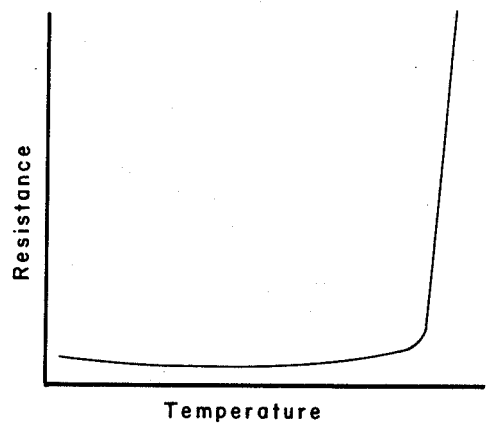
Fig. 2
Fig. 3

United States Patent Office 3,020,462
Patented Feb. 6, 1962

3,020,462
SYNCHRONOUS MOTOR CONTROL
Dean J. MacGregor, Amherst, N.Y., assignor to Westinghouse Electric Corporation, East Pittsburgh, Pa., a corporation of Pennsylvania
Filed June 19, 1959, Ser. No. 821,601
4 Claims. (Cl. 318—170)

This invention relates to synchronous motor controls and more particularly to a system of control for protecting the damper winding of a synchronous alternating current motor.

It is well known that synchronous motors are not self starting and they are therefore built with a damper or amortisseur winding. With the field winding shorted through a discharge resistor, the damper winding functions as a squirrel cage rotor bringing the rotor practically to synchronous speed. Thereafter, the motor is synchronized by the proper application of the direct current excitation to the motor field winding. Since the damper winding is only used during starting of the synchronous motor it is designed with a limited thermal capacity. As a result, a protection circuit for the damper winding is necessary to insure that the damper winding will not be destroyed during subsynchronous operation of the motor.

Conventional damper winding protection circuits consist of a thermal relay actuated by a transformer energized from the motor field winding which imparts frequency sensitive characteristics to the relay. The relay has moving parts which frequently corrode, making it inoperative. The relay is subject to malfunctions due to vibration, shock or contaminated atmospheres. The conventional damper winding protection circuits afford no protection below approximately 50% slip. Thus, the conventional damper winding protection circuit has many disadvantages and shortcomings.

The principal object of this invention is to provide a damper winding protection scheme for a synchronous motor which is extremely reliable through the use of static devices requiring little or no maintenance.

Another object of the invention is to provide a damper winding protection scheme for a synchronous motor control system which is responsive to slip frequency and which has an inverse trip time versus slip frequency characteristic.

Another object of my invention is to provide a damper winding protection scheme for a synchronous motor control system providing current pulses of predetermined magnitude and width which are counted and interpreted in relation to the thermal capacity of the damper winding.

Another object of my invention is to provide a damping winding protection scheme for a synchronous motor control system having means for adjusting the time of response of the damper winding protection circuit for adaption with damper windings having different thermal capacity characteristics.

Further objects and advantages of the invention will be readily apparent from the following detailed description taken in conjunction with the drawing, in which:

FIGURE 1 is a schematic diagram of an illustrative embodiment of my invention with the wave forms at progressive stages indicated thereon, FIG. 2 is a graphical representation illustrating a characteristic curve of a device used in the circuit shown in FIG. 1, and FIG. 3 is a graphical representation of the operating characteristics of the circuit shown in FIG. 1.

The invention is shown embodied in an electrical control system for a synchronous motor 2 having a field winding 4. The alternating current power supply is indicated by the power supply leads 6 while the direct current excitation supply is represented by the excitation leads 8. The excitation leads 8 are illustrated to have a polarity as shown in the drawing. The positive potential side of the field winding 4 is grounded as indicated at 10. The main contactor 12, having an operating coil 14 and main contacts 16, as well as auxiliary contacts 18 and 20, is energized to its closed position by depressing a start pushbutton 22 to its closed position. The pushbutton contacts 22 are in series connection with a stop button 24 along with the operating coil 14 and a normally open contact 26 across the power supply lines 6. The normally open contact 26 will be referred to as the damper protection relay contact and its purpose will be more fully described hereinafter. Closing the start button 22 energizes a transformer 23 and establishes a positive and negative supply voltage through rectifier bridge means 25 and filtering capacitor means 27 for biasing purposes. Upon energization of the power supply a signal input 35 is supplied to a flip-flop element 29 thereby turning the output of the flip-flop element 29 at terminal Y "on." Transistor 31 amplifies the output signal at terminal Y and energizes the operating coil 60 of the normally open contact 26. Contact 26 then closes connecting the contactor coil 14 across the power supply lines 6. In such a manner, the control circuit is properly energized before alternating current power is applied to the motor. The diode 33 across the coil 60 is a commutating diode to prevent the induced voltage on de-energization from damaging transistor 31. An output pulse, I, at terminal 348 from the damper protective circuitry, described hereinafter, will turn the flip-flop element output "off," opening the relay 60 and shutting down the motor 2. During start-up, the motor will accelerate to a predetermined speed whereupon a field contactor 28 having an operating coil 30 will be energized closing its normally open contacts 32 and 34 while opening its normally closed contact 36. FIGURE 1 illustrates the position of the contacts in their normal position prior to energization of the circuit. During start-up a field discharge resistor 40 is connected across the field winding 4 by means of the normally closed contact 36. Upon attainment of the proper speed for synchronization a synchronizing circuit 42 is actuated thereby closing its relay contact 44 so that the operating coil 30 of the field contactor 28 is energized removing the field discharge resistor 40 from the circuit and closing the normally open field contacts 32 and 34.

Prior to the motor attaining the proper speed for synchronization, however, the field discharge resistor 40 is connected across the field winding 4 by the field contactor 28. The damper or amortisseur windings, incorporated in each pole face of the rotor (not shown), combined with the short circuited field winding 4 give the effect of a squirrel cage motor resulting in acceleration of the rotor as a conventional alternating current induction machine. During the interval between initial starting of the motor and the attainment of the proper speed for synchronization, the damper winding protection circuit, which is the substance of this invention, functions in the synchronous motor control system. The damper winding protection circuit also functions after the motor has pulled out of step and must acecelerate to synchronizing speed again. If a motor is overloaded sufficiently to prevent acceleration to synchronizing speed it is necessary that damper winding protection circuit shut down the motor before the winding is damaged. This is part of the reason why it is important to have protection at slips less than 50% which conventional damper winding protection relays do not provide.

In accordance with the invention, the damper winding protection scheme utilized is shown as including several parts; an input circuit 50, a pulse forming circuit 52, a square pulse generating circuit 54, an amplifier and thermistor circuit 56, and a sensing circuit 58. The input circuit 50 provides signal means responsive to variations in the induced alternating current in the field winding. The input signal is supplied to the pulse forming circuit 52 which in turn provides an output to the square pulse generating circuit 54. The square pulse generating circuit 54 provides an input to the amplifier and thermistor circuit 56 resulting in a current pulse output of predetermined magnitude and width. The sensing circuit 58 senses the change in thermistor resistance after the occurrence of a predetermined number of current pulses and provides an output signal to the relay coil 60. Deenergization of the relay coil 60 opens the normally open contact 26 thereby deenergizing the operating coil 14 and disconnecting the motor 2 from the power lines 6.

The input circuit 50 reduces the voltage at the terminals of the field winding 4 to a more suitable magnitude. A slidable tap 62 on the discharge resistor 40 provides means for sampling the field terminal voltage. Three resistive elements 64, 66 and 68 connected in series to ground 10 and a sliding tap connection 70 reduces the voltage further. Point A therefore has a wave form as indicated in the figure. The signal at point A is applied to a saturating square loop core 82 through a dropping resistor 84 so that an output pulse is obtained for every half cycle at point B with its associated wave form as indicated. A full wave rectifier bridge 86 inverts the negative pulses so that a positive pulse is obtained at the output terminals of the rectifier bridge 86 (wave form C) for every half cycle of the induced alternating current in the field winding. It is to be noted that the induced alternating current in the field winding 4 has a frequency which is equivalent to the slip frequency of the machine and will hereinafter be refered to as the slip frequency.

The output pulse from the full wave rectifier 86 is shaped by resistors 88 and 90 and the capacitor 92 to have a wave form as shown at point D in the figure. A rectifier 94 in series with a resistor 96 across the resistor 90 blocks the positive portion of the shaped wave form, D, so that a narrow, sharp, negative trigger pulse is supplied to the square pulse generating circuit 54.

The square pulse generating circuit 54 comprises generally a first transistor 100 connected in a flip-flop relation to a second transistor 102. The base electrode 104 of the transistor 100 is biased positively through the resistor 106.

The emitter electrode 108 of the transistor 100 and the emitter electrode 110 of the transistor 102 are positively biased through a resistor 112. The collector electrodes 114 and 116 are negatively biased through resistors 118 and 120, respectively. Another resistor 122 provides a means for negatively biasing the base electrode 124 of the transistor 102. A capacitor 126 connects the collector electrode 114 to the base electrode 124 of the transistor 102.

The pulses of negative polarity fed into the square pulse generating circuit 54 trigger the flip-flop arrangement of the transistors 100 and 102 to have a current output pulse of constant time duration for each trigger pulse. The output pulse width is independent of the duration of the input trigger pulse. Initially transistor 100 is biased non-conducting and transistor 102 is biased conducting. Resistors 112, 118 and 120 are chosen to be of equal value as are the positive and negative voltage sources. Therefore the common emitter circuit 108–110 is at ground potential because of current flow through transistor 102. Capacitor 126 charges negatively on the collector electrode 114 side and is at ground on the base electrode 124 side.

The appearance of a negative trigger pulse D on the base electrode 104 renders transistor 100 conductive. Current flows from the positive potential source through resistor 112 and emitter-collector 108, 114 to the negative plate of the capacitor 126 causing it to discharge. The discharge current flows into the base electrode 124 causing transistor 102 non-conducting and causing an output pulse, E.

After the trigger pulse on the base electrode 104 decays, the transistor 100 remains conducting because of the current flow from the positive potential source through the resistor 112, emitter 108, base 104 and resistor 96 to ground 10. Thus, the capacitor 126 continues discharging until current into the base electrode 124 is insufficient to keep the transistor 102 non-conducting. The negative bias through resistor 122 switches transistor 102 to its conducting state, removing the output pulse, E. As soon as transistor 102 becomes conductive, the common emitter 108—110 goes to ground potential, the sustaining current through emitter base circuit 108—104 ceases and transistor 100 becomes non-conductive, completing a cycle.

The output of the square pulse generating circuit 54 is a constant width pulse for every trigger pulse with a wave form as indicated and shown with reference to point E in the circuit diagram. The negative pulses of constant width occur each half cycle of the induced alternating current in the field winding 4. As the frequency of the induced current and consequently the slip frequency is reduced, the occurrence of the half wave cycles are, of course, also diminished. As a result the negative square pulses appearing at point E become less frequent. It is to be noted that the average current at point E will decrease as the slip frequency decreases. The pulses occurring at point E are then amplified through a transistor 200 and are used to control a power transistor 202 in the amplifier and thermistor circuit 56.

Referring to the amplifier and transistor circuit 56, the transistor 200 has a base electrode 204 connected to the collector electrode 116 through a resistor 206. The base electrode 204 is positively biased through a resistor 208. The transistor 200 has a collector electrode 210 negatively biased through a resistor 212 and an emitter electrode 214 connected to the base 218 of power transistor 202. The power transistor 202 has a base electrode 218, an emitter electrode 220, and a collector electrode 222. The base electrode 218 is positively biased through a resistor 216 and connected to the emitter electrode 214. A relatively large negative potential source, V compared to the magnitude of the other biasing potentials is provided in the amplifier and thermistor circuit 56 and indicated at 224. The large potential V is connected to ground 10 through a potentiometer 226, resistor 228, a positive temperature coefficient thermistor 230 and the collector-emitter circuit of the transistor 202.

It is to be understood that the positive temperature coefficient thermistor is a non-linear resistance device which has the characteristic of markedly changing its resistance value upon occurrence of a predetermined temperature within the thermistor. The thermistor 230 is thermally insulated so that upon a pulse of current flowing therethrough, the energy dissipation therein is stored causing a rise in temperature within the thermistor. The temperature will continue to rise until the temperature reaches a predetermined level at which a rapid rise in thermistor resistance occurs. FIG. 2 illustrates the characteristic curve of the thermistor 230. The increased resistance is then in turn detected by the sensing circuit 58.

Upon receipt of a negative square pulse, E, from the generating circuit 54, the transistor 200 becomes conductive simulating a switch in the closed position so that the positive potential on the base electrode 218 of the transistor 202 is greatly reduced causing the power transistor 202 to also become conductive. The transistor 202 is conductive during each negative square pulse, E, which is provided as an input to the amplifier and thermistor circuit 56. As a result, a current pulse will flow through the positive temperature coefficient thermistor 230 each time a negative square pulse appears at the amplifier and thermistor circuit. The magnitude of the current flow through the thermistor 230 is determined by the series resistance of the potentiometer 226, resistor 228 and the thermistor 230. The potentiometer 226 allows adjustment of the current magnitude to adapt the protective circuit to damper windings of any thermal capacity characteristic.

Thus a definite amount of energy is stored in the thermistor each time a pulse of current flows through it. Since the pulses occur at a rate determined by the slip frequency at which the machine is running at a particular instant, the rate of heating of the thermistor varies with the slip frequency. The thermistor, therefore, integrates the instantaneous rates of heating and thereby simulates the total temperature of the damper winding.

It is of much assistance in understanding the sensing circuit 58 to consider the wave form at point F on the negative side of the thermistor 230 and point H on the positive or grounded side of the thermistor 230. Prior to current flow through the thermistor 230, the thermistor is at ambient temperature offering characteristically little resistance. Therefore during the initial current pulses when transistor 202 is conducting, point H is essentially grounded through the collector-emitter circuit of the power transistor 202. This is also true of point F since there is relatively little resistance across the thermistor 230 and hence very little voltage drop therethrough. However, when the thermistor attains a predetermined temperature level, its resistance changes markedly and the potential at point F is maintained at a level somewhat more negative than ground and has a wave form indicated by the wave from F'. The point H continues to have a wave form as indicated previously. That is narrow pulses of potential appear at point H each time the power transistor 202 is non-conductive. The potentials at points F and H are then sensed by the circuit 58.

The sensing circuit 58 has a first transistor 300 having a base electrode 302, collector electrode 304 and an emitter electrode 306. The base electrode 302 is positively biased through the resistor 310 as well as being connected to point F through the resistor 312. The collector electrode 304 is negatively biased through the resistor 314. The emitter electrode 306 is grounded at 10.

A second transistor 330 is utilized in the sensing circuit 58. The second transistor 330 has a base electrode 332, a collector electrode 334 and an emitter electrode 336. The base electrode 332 is biased positively through the resistor 340 and also connected to the collector electrode 304 through a resistor 342 as well as being connected to point H previously discussed through a resistor 344. The collector electrode 334 is negatively biased through a resistor 346 and an output terminal 348 is also connected to the collector electrode 334. The emitter electrode 336 is grounded to the electrical ground 10 in the same manner as the emitter electrode 306.

Operation of the sensing circuit 58 can be traced as follows:

When the thermistor 230 is at room temperature and carrying current, the voltage across the thermistor 230 and transistor 202 to ground 10 is relatively low leaving the transistor 300 biased in the cutoff region. As a result, the voltage to the base electrode 332 holds the transistor 330 in its saturation region thereby simulating a switch in the closed position and preventing an output signal from occurring at the output terminal 348.

When the temperature of the thermistor 320 is above the predetermined level necessary for a marked change in its resistance and carrying current, the voltage to ground 10 at point F is a relatively large negative voltage causing the transistor 300 to be conductive simulating a switch in the closed position. This in turn allows the positive bias potential through the resistor 340 to cut off the transistor 330 thereby simulating a switch in the open position so that the negative bias on the collector electrode 334 appears at the output terminal 348.

The wave form appearing at the output terminal 348 is as indicated by the letter I.

The resultant output at the output terminal 348 can, of course, be used for any suitable control means and is herein shown as being utilized for deactuating, through the flip-flop element 29, the relay coil 60 which, in turn, will open the contact 26 in the pushbutton circuit to disconnect the synchronous motor from the power supply lines 6.

When the thermistor 230 has a temperature either above or below the predetermined temperature level characteristic of the thermistor and is not carrying current, the relatively large negative voltage from the source 224 present at point F will cause the transistor 300 to become conductive with a resulting erroneous output signal at the output terminal 348. To prevent such a happening, the negative voltage pulses occurring at point H during the intervals between the square pulses, E, to the transistor 200 will be applied to the base electrode 332 through the resistor 344 so that the transistor 330 is maintained in the saturated region with no resultant output during the portion of the cycle when the thermistor current is of zero magnitude.

It is to be noted that the potentiometer 226 in the amplifier and thermistor circuit 56 allows adjustment of the magnitude of the current flowing through the thermistor 230. In this manner, the time delay necessary to trip the motor from the line may be varied in accordance with the allowed locked rotor time as may be specified by the motor designer. As the slip frequency decreases the number of current pulses through the thermistor 230 also decreases and the damper winding protection circuit automatically provides longer trip times to approximate a hyperbolic characteristic curve of trip time versus slip frequency. Such a characteristic curve is as shown in FIGURE 3. The curve is calibrated for a specified two second locked rotor time for a specific motor. The slip frequency, or frequency of the induced alternating current in the field winding, is plotted on the abscissa while the time delay in seconds is plotted on the ordinate. From this curve it can be seen that the present invention provides a very fast tripping signal should the motor be overloaded in such a manner that the slip frequency remains excessive even for a short period of time. However, the damper winding protection circuit allows a greater time delay as the slip frequency decreases. Should the motor have failed to synchronize during the allowable time period the sensing circuit 58 will provide an output signal for disconnecting the synchronous motor from the alternating current lines 6. Should the motor synchronize prior to that time then no further pulses of current will flow through the thermistor 230 and no output from the sensing circuit 58 will result.

The length of delay time will be affected by ambient temperature variations and voltage variations. In some cases these effects are desirable; as, for example, increases in ambient temperature shorten the allowable overload time of electrical apparatus. If undesirable these effects can be compensated by use of suitable sensitive elements.

This damper winding protective circuit will reset in a short time. The thermistor temperature need decrease only a few degrees to drop the resistance to the flat portion of the curve in FIG. 2. However, successive time delays will be shorter than the first as the thermistor 230 will be started at an elevated temperature. This is a very desirable feature in some applications; for example, it provides protection when a motor winding is heated during the first start and would otherwise burn out in a shorter time on successive starts.

My invention provides a damper winding protection circuit which is very simple and which is rather inexpensive. My invention maintains its calibration and is impervious to corrosive atmospheres which can make conventional damper winding protection circuits inoperative.

Protection of the damper winding is obtained throughout the entire slip frequency range and thereby extends considerably the range wherein the damper winding can be protected.

Various modifications are possible within the spirit and scope of the present invention. While PNP transistors have been indicated, it is to be understood that NPN transistors may be used with proper changes in polarity. Static control means capable of interrupting and switching the normally open relay contact 26 may be employed when desirable or suitable. The positive temperature coefficient thermistor 230 may be of any suitable operating type and may even be a non-linear device capable of switching its state upon attainment of any number of variables. The non-linear device need not necessarily be a resistance element. Any device capable of integrating a sensed quantity frequency modulated by the slip frequency to simulate the temperature of the damper winding may be used. These alterations and substitutions are merely by way of example. Although a particular embodiment of the invention has been shown for the purpose of illustration, it is to be understood that the invention is not limited to the specific arrangements shown, but includes all equivalent embodiments, modifications and substitutions within the spirit and scope of the invention.

I claim as my invention:

1. In a damper winding protection circuit for a synchronous alternating current motor having a field winding, saturating core means responsive to the induced alternating current in the field winding for providing a pulse signal for each half cycle of the induced alternating current, rectifier means connected to receive said output pulses as an input and inverting the negative pulses so that a positive pulse is obtained for each half cycle of the induced alternating current in the field winding, differentiating circuit means for sharpening the output pulses and means for blocking the positive portion of said output pulses so that a narrow sharp pulse is obtained for each half cycle of the induced alternating current voltage in the field winding, square pulse generating means receiving said sharp pulses and generating a square pulse of constant width for each sharp pulse, a positive temperature coefficient thermistor receiving said square pulses having an energy input for each said square pulse proportional to the magnitude and the time length of each said pulse, said positive temperature coefficient resistance having a marked change in resistance upon occurrence of a predetermined series of said square pulses, said positive temperature coefficient thermistor capable of storing the input energy thereby causing a rise in the temperature of said thermistor and a rapid increase in thermistor resistance upon attainment of a predetermined temperature rise, and means for detecting said increased resistance for altering the connections to said motor upon occurrence of said increased resistance.

2. In a damper winding protection circuit for a synchronous alternating current motor having a field winding, means operably connected to said field winding for obtaining a trigger pulse for each half cycle of the induced alternating current in the field winding, means responsive to said trigger pulses for providing a square pulse of constant time length for each trigger pulse, first transistor means adapted to be conductive upon occurrence of a square pulse, a positive temperature coefficient thermistor, a potential source across said thermistor and first transistor means, said thermistor adapted to store the energy dissipated therein upon the first transistor means being conductive, second transistor means biased to cutoff and adapted to be conductive in response to the voltage across said thermistor and first transistor means, third transistor means biased to cutoff and adapted to be responsive to the conduction of said second transistor means, an output terminal and an electrical ground, a potential source across said output terminal to ground, said third transistor means being conductive connecting said output terminal to ground upon said second transistor means being non-conductive and for disconnecting said output terminal to ground upon said second transistor means being conductive, said first transistor means providing an input to said third transistor means rendering it conductive during the intervals between said pulses.

3. In a damper winding protection circuit for a synchronous alternating current motor having a field winding, means responsive to the induced alternating current in the field winding for providing a trigger pulse for each half cycle of the induced alternating current in the field winding, means for forming a constant width pulse for each said trigger pulse, means for amplifying each said constant width pulse to a constant magnitude containing a fixed quantity of energy, and an energy responsive device for providing an output signal upon the energy to said device exceeding a predetermined summation.

4. In a damper winding protection circuit for a synchronous alternating current motor having a field winding, means responsive to the induced alternating current in the field winding for providing a trigger pulse for each half cycle of the induced alternating current in the field winding, means for forming a constant width pulse for each said trigger pulse, means for amplifying each said constant width pulse to a constant magnitude containing a fixed quantity of energy, an energy responsive device for providing an output signal upon the energy to said device exceeding a predetermined summation, and means for allowing a preselected quantity of energy from each constant width pulse to said device.

References Cited in the file of this patent
UNITED STATES PATENTS
2,304,542     Chambers _____ Dec. 8, 1942